United States Patent
Wang et al.

(10) Patent No.: US 12,057,559 B2
(45) Date of Patent: Aug. 6, 2024

(54) LITHIUM ION BATTERY MATERIALS RECYCLING METHOD

(71) Applicant: National University of Singapore, Singapore (SG)

(72) Inventors: Qing Wang, Singapore (SG); Juezhi Yu, Singapore (SG)

(73) Assignee: National University of Singapore, Singapore (SG)

( * ) Notice: Subject to any disclaimer, the term of this patent is extended or adjusted under 35 U.S.C. 154(b) by 539 days.

(21) Appl. No.: 17/287,466

(22) PCT Filed: Oct. 22, 2019

(86) PCT No.: PCT/SG2019/050523
§ 371 (c)(1),
(2) Date: Apr. 21, 2021

(87) PCT Pub. No.: WO2020/086000
PCT Pub. Date: Apr. 30, 2020

(65) Prior Publication Data
US 2021/0391605 A1 Dec. 16, 2021

(30) Foreign Application Priority Data
Oct. 26, 2018 (SG) .............................. 10201809492S

(51) Int. Cl.
| | |
|---|---|
| *H01M 10/54* | (2006.01) |
| *C25B 1/16* | (2006.01) |
| *C25B 15/08* | (2006.01) |

(52) U.S. Cl.
CPC ............... *H01M 10/54* (2013.01); *C25B 1/16* (2013.01); *C25B 15/087* (2021.01)

(58) Field of Classification Search
CPC ......... H01M 10/54; C25B 15/087; C25B 1/16
See application file for complete search history.

(56) References Cited

FOREIGN PATENT DOCUMENTS

| | | |
|---|---|---|
| CN | 103346365 A | 10/2013 |
| CN | 107123839 A | 9/2017 |

OTHER PUBLICATIONS

Yu et al., A redox targeting-based material recycling strategy for spent lithium ion batteries. Energy and Environmental Science, Aug. 2, 2019, vol. 12, pp. 2672-2677. (Year: 2019).*
Yu, J et al., A red ox targeting-based material recycling strategy for spent lithium ion batteries. Energy Environ. Sci., Aug. 2, 2019, vol. 12, pp. 2672-2677 [Retrieved on Nov. 14, 2019] <DOI: 10.1039/C9EE014 78K> p. 2673.

(Continued)

*Primary Examiner* — Karie O'Neill Apicella
(74) *Attorney, Agent, or Firm* — Patterson + Sheridan, LLP

(57) ABSTRACT

Disclosed herein is a method of recovering lithium or sodium from an active material of a lithium or sodium ion battery. In a preferred embodiment, the method comprises a redox-targeting reaction of a used active material LiFePO4 with a redox mediator $[Fe(CN)_6]^{3-}$ in a tank to produce lithium ions, circulating the reacted redox solution into a cell to regenerate said redox mediator and enabling said lithium ions to migrate through a membrane towards a cathode wherein said lithium ions are captured as LiOH through an electrochemical reaction.

14 Claims, 2 Drawing Sheets

(56) References Cited

OTHER PUBLICATIONS

Figure 1:
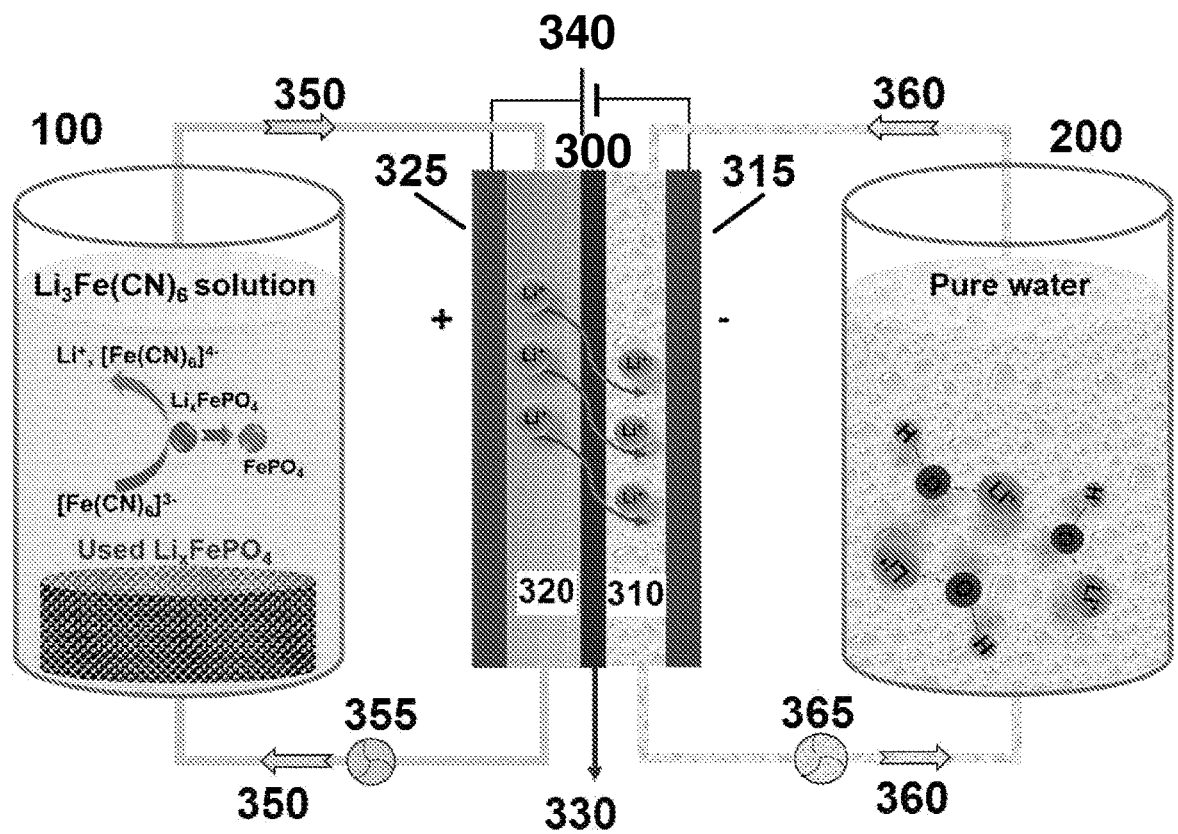

Granata, G. et al., Product recovery from Li-ion battery wastes coming from an industrial pre-treatment plant: Lab scale tests and process simulations. Journal of Power Sources, Feb. 2, 2012, vol. 206, pp. 393-401 [Retrieved on Nov. 18, 2019] <DOI: 10.1016/J.JPOWSOUR.2012.01 .115> abstract; p. 394-395.
International Search Report and Written Opinion in related application PCT/SG2019/050523 dated Dec. 3, 2019.
M. Skyllas-Kazacos et al. "Progress in Flow Battery Research and Development" 2011 J. Electrochem. Soc. 158 R55.
Weber et al.; "Redox Flow Batteries: a Review" J Appl Electrochem (2011) 41:1137-1164.

\* cited by examiner

US 12,057,559 B2

LITHIUM ION BATTERY MATERIALS RECYCLING METHOD

FIELD OF INVENTION

The invention relates to a method recovering lithium and/or sodium from an active material of a lithium and/or sodium ion battery.

BACKGROUND

The listing or discussion of a prior-published document in this specification should not necessarily be taken as an acknowledgement that the document is part of the state of the art or is common general knowledge.

Lithium ion batteries (LIBs) are the undisputed choice of power source for portable devices and they are increasingly in demand for applications such as electrical energy storage (EEs) and electric vehicle (EV). The widespread application of LIBs has resulted in two issues of particular concern: (1) the price of Li and Co raw materials ($Li_2CO_3$ and $Co_3O_4$) have been raised to \$24,000 and \$33,000 per ton, respectively, due to the large demand for cathode materials such as $Li_2CoO_2$ and $LiFePO_4$; (2) it is evident that LIBs will generate a large amount of waste at the end of their lifetime. This is of great concern to the environment, and the increased demand for the materials will speed up depletion of Li and other metals resources if they are not properly reused. Lithium and cobalt have been recognised as strategic resources as these elements are relatively rare in the earth's crust. Moreover, spent LIBs comprise valuable metals such as Al, Cu, Co, Li, and the concentration of these elements is much higher than that in natural ores.

Given the increase in demand for LIBs and the accumulation of waste generated from spent LIBs, there is increasing importance for a viable recycling process for extracting metal elements from spent LIBs for the sustainable deployment of this technology. Some companies and institutions have established pilot lines for LIB recycling based on the traditional hydrometallurgical extraction process. The typical hydrometallurgical extraction process consists of the following steps: (1) releasing residual electricity of spent batteries by discharge pre-treatment; (2) removing plastic packaging and casings from the batteries and separating out the cathode and anode electrodes; (3) scraping cathodic and anodic active materials from the electrodes; (4) dissolving the cathodic active material (such as $LiCoO_2$) using a strong acid (e.g. HCl or $H_2SO_4$) to form a solution containing $Co^{2+}$, $Li^+$, $SO_4^{2-}$ ions (leaching process); (5) adding NaOH to the resulting solution to precipitate $Co(OH)_2$, leaving $Li^+$, $Na^+$, $OH^-$, $SO_4^{2-}$ ions in the solution, and then adding $Na_2CO_3$ to the solution to precipitate $Li_2CO_3$ (metal separation process).

The above hydrometallurgical extraction process suffers from the following issues. Firstly, the process is complicated and involves many steps. In addition, it requires addition of a large amount of chemicals such as HCl, $H_2SO_4$, NaOH and $Na_2CO_3$, and in connection to this addition, generates a large amount of waste material after $Li_2CO_3$ has been precipitated, resulting in secondary pollution. Furthermore, traditional hydrometallurgical extraction processes are unable to effectively extract or leach $LiFePO_4$ because this material does not dissolve in acid, which is problematic because $LiFePO_4$ is a widely-used cathode material for electrical energy storage (EEs) and electric vehicle (EV).

There is therefore a need for an improved, simpler and low-cost process for recycling LIBs that avoids using strong acids and mitigates generation of secondary waste material, which solves one or more problems identified above.

SUMMARY OF INVENTION

Aspects and embodiments of the invention will now be described by reference to the following numbered clauses.

1. A method of recovering lithium or sodium from an active material of a lithium or sodium ion battery, respectively, the method comprising:

(a) providing an active material comprising lithium or sodium ions;

(b) adding the active material to a redox solution that comprises a solvent and a redox mediator to form a redox solution comprising lithium or sodium ions in a first tank;

(c) moving the redox solution from the first tank to a redox flow cell comprising a cathode compartment, having a cathode electrode, and an anode compartment, having an anode electrode, separated by an ion selective membrane, where the cathode electrode and anode electrode are attached to a power supply and
   the redox solution is subjected to an electrochemical reaction on the anode electrode, where the electrochemical reaction on the anode:
   regenerates the redox mediator, which is then returned to the first tank; and enables transport of the lithium ions through the ion selective membrane into the cathode compartment, which comprises an aqueous catholyte solution as that is obtained from a second tank comprising said aqueous catholyte solution;

(d) capturing the lithium ions in the cathode compartment through an electrochemical reaction on the cathode electrode as LiOH and transferring the resulting aqueous LiOH catholyte solution to a second tank, wherein:
   steps (c) and (d) can be repeated until the active material is consumed.

2. The method according to Clause 1, wherein the active material is a cathodic and/or anodic active material.

3. The method according to Clause 2, wherein the cathodic active material is still attached to a cathode electrode of a dismantled sodium- or lithium-ion battery or is provided free from the cathode electrode.

4. The method according to Clause 2 or Clause 3, wherein the cathodic active material is selected from one or more of $NaFePO_4$, $NaCoO_2$, more particularly, $Li_xFePO_4$, $Li_xNiCoMnO_2$, $Li_xCoO_2$, $Li_xFePO_4$, $Li_xNi_{0.33}Al_{0.33}O_2$, $Li_xMn_2O_4$, $Li_xNi_{0.5}Mn_{1.5}O_4$, and $Li_xCoO_2$, where $0<x\leq 1$.

5. The method according to Clause 4, wherein the cathodic active material is $Li_xFePO_4$.

6. The method according to any one of the preceding clauses, wherein the redox mediator is selected from one or more of the group consisting of ferricyanide ($M_3Fe(CN)_6$), ferrocyanide ($M_4Fe(CN)_6$), ferrocene ($C_{10}H_{10}Fe$) and derivatives thereof, iodide (MI) and bromide (MBr), where in each case M is independently selected from the group consisting of Li, Na, K and $NH_4$.

7. The method according to Clause 6, wherein the redox mediator is selected from one or more of the group consisting of ferricyanide ($M_3Fe(CN)_6$), ferrocyanide ($M_4Fe(CN)_6$), iodide (MI), and bromide (MBr), where in each case M is independently selected from the group consisting of Li, Na, K and $NH_4$.

8. The method according to Clause 7, wherein the derivative of ferrocene is di(ethylsulfonic lithium) ferrocene ($C_{14}H_{16}FeS_2O_6Li_2$).

9. The method according to any one of Clauses 6 to 8, wherein the total concentration of the redox mediator present in the solvent is from 0.05 M to 1.5 M, such as 0.2 M.

10. The method according to any one of Clauses 2 to 9, wherein the solvent is pure water.

11. The method according to any one of the preceding clauses, wherein the aqueous catholyte solution is initially selected from one of water, water comprising oxygen, water comprising air, water comprising oxygen and $CO_2$, or water comprising air and $CO_2$.

12. The method according to any one of the preceding clauses, wherein after steps (b) and (c) have been completed, the aqueous catholyte solution is an aqueous LiOH solution, an aqueous LiOH solution comprising oxygen, an aqueous LiOH solution comprising air, an aqueous LiOH solution comprising oxygen and $CO_2$ with $Li_2CO_3$ precipitate, or an aqueous LiOH solution comprising air and $CO_2$ with $Li_2CO_3$ precipitate.

13. The method according to any one of Clauses 2 to 12, wherein the anodic active material is still attached to an anode electrode of a dismantled lithium-ion battery or is provided free from the anode electrode.

14. The method according to any one of Clauses 2 to 13, wherein the anodic active material is selected from one or more of $Li_4Ti_5O_{12}$, Graphite, Silicon, Hard carbon.

15. The method according to any one of the preceding clauses, wherein the active material is a cathodic active material.

DRAWINGS

Certain embodiments of the present disclosure are described more fully hereinafter with reference to the accompanying drawings.

Figure 2:
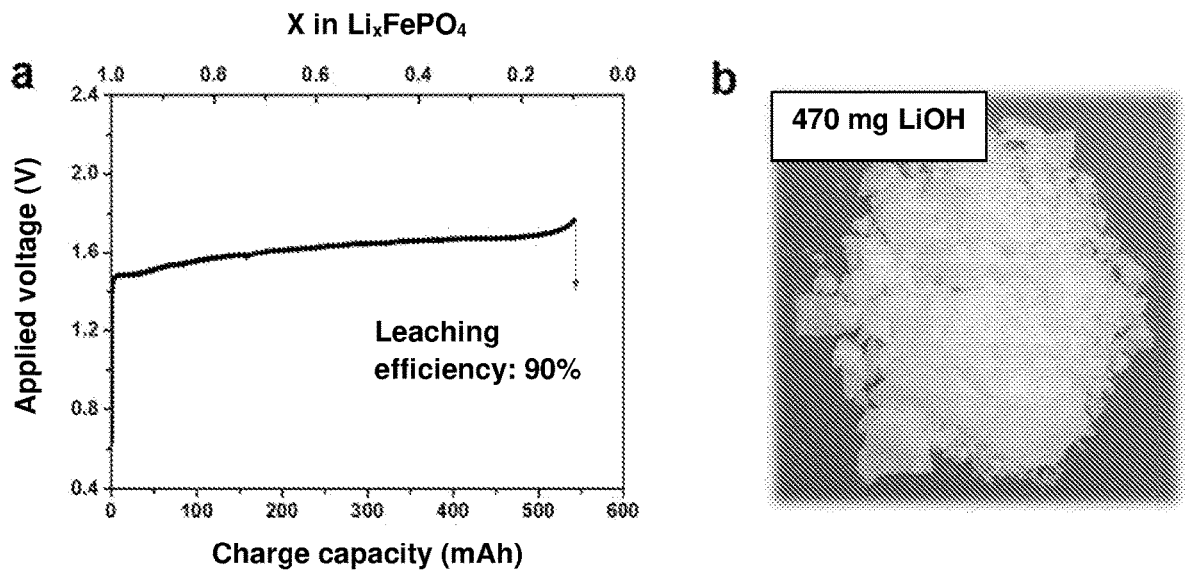
Figure 3:
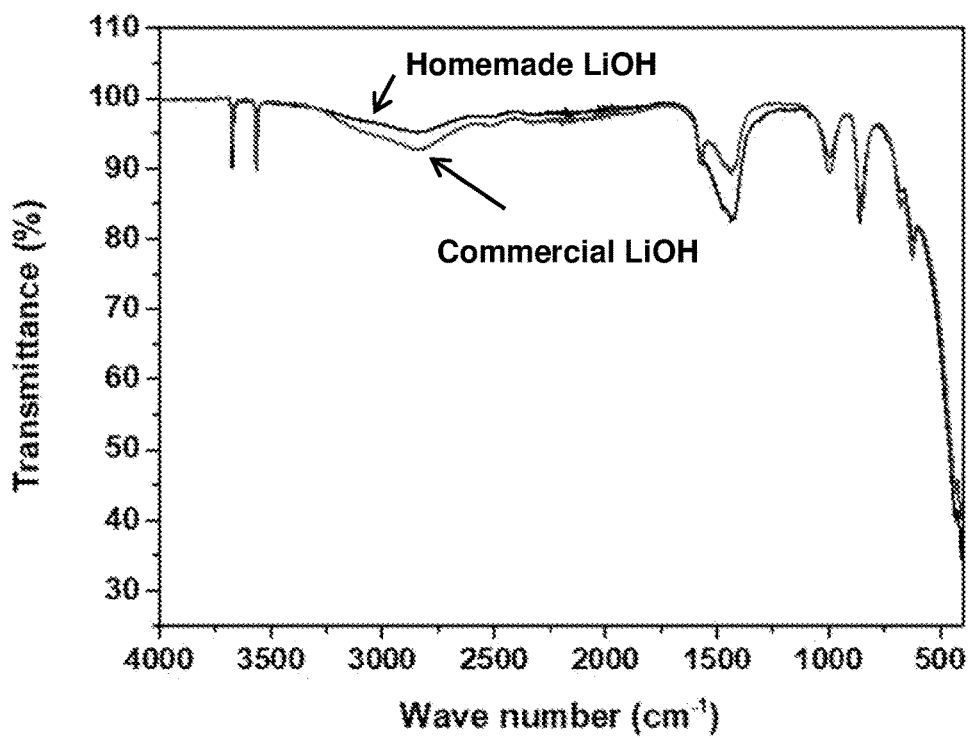

FIG. 1 depicts a schematic illustration of the setup and operating principle of an embodiment of the current invention relating to a method of recovering lithium from a cathodic active material of a lithium ion battery FIG. 2 depicts (a) how applied voltage changes with respect to charge capacity and Li content residue in $Li_xFePO_4$ and (b) a photo of LiOH powder obtained from an embodiment of the current invention FIG. 3 depicts a IR spectrum of the LiOH powder obtained from Example 1 of the current invention as compared to commercial LiOH

DESCRIPTION

It has been surprisingly found that lithium or sodium can be recovered by an improved, low-cost method that generates less secondary pollution as compared to traditional hydrometallurgical extraction processes. Moreover, the method combines leaching and separation into one step which proceed simultaneously and continuously, making the apparatus operating the current method much more compact and efficient. As a large amount of spent lithium ion batteries have been accumulated from the increase in demand for electrical vehicles, energy storage and electronics, this method may provide a commercially-viable solution to deal with the critical challenge of recycling this valuable waste, which ensures the sustainability of, particularly, lithium ion battery technology.

Thus, there is disclosed herein a method of recovering lithium or sodium from an active material of a lithium or sodium ion battery, respectively, the method comprising:

(a) providing an active material comprising lithium or sodium ions;

(b) adding the active material to a redox mediator solution that comprises a solvent and a redox mediator to form a redox solution comprising lithium or sodium ions in a first tank;

(c) moving the redox solution from the first tank to a redox flow cell comprising a cathode compartment, having a cathode electrode, and an anode compartment, having an anode electrode, separated by an ion selective membrane, where the cathode electrode and anode electrode are attached to a power supply and the redox solution is subjected to an electrochemical reaction on the anode electrode, where the electrochemical reaction on the anode:

regenerates the redox mediator, which is then returned to the first tank; and enables transport of the lithium ions through the ion selective membrane into the cathode compartment, which comprises an aqueous catholyte solution as that is obtained from a second tank comprising said aqueous catholyte solution;

(d) capturing the lithium ions in the cathode compartment through an electrochemical reaction on the cathode electrode as LiOH and transferring the resulting aqueous LiOH catholyte solution to a second tank, wherein:

steps (c) and (d) can be repeated until the active material is consumed.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

As will be appreciated, the process above is agnostic to whether the active material is obtained from a cathode and/or an anode. This is because the process can work for active materials of both types, though there may be a preference for cathode active materials.

As will be appreciated, the process described above relates to the recovery of lithium from spent (retired) batteries or from waste materials produced during the manufacturing process. As such, the active materials referred to above may not be capable of functioning in a battery in their current form and so there is a need to recover the lithium for reuse.

The separator divides the cathode compartment from the anode compartment. It can be an electro-active ion conducting membrane (e.g., a lithium or sodium ion conducting membrane). The separator prevents cross-diffusion of the redox mediator and allows for movement of the electroactive ions (e.g., lithium ions, sodium ions, magnesium ions, aluminum ions, silver ions, copper ions, protons, or a combination thereof). For example, the separator may be a lithium phosphorus oxynitride glass, a lithium thiophosphate glass, sodium phosphorus oxynitride glass, a sodium thiophosphate glass, a NASICON-type lithium conducting glass ceramic, a NASICON-type sodium conducting glass ceramic, a Garnet-type lithium or sodium conducting glass ceramic, a ceramic nanofiltration membrane, a lithium or sodium ion-exchange membrane, or suitable combinations thereof.

Both electrodes in the apparatus, i.e., the cathode and the anode, can be a carbon, a metal, or a combination thereof. Preferably, these two electrodes have high surface area, with or without one or more catalysts, to facilitate the charge collection process. They can be made of a carbon, a metal, or a combination thereof. Examples of an electrode can be found in Skyllas-Kazacos, et. al., Journal of The Electrochemical Society, 158, R55-79 (2011) and Weber, et. al., Journal of Applied Electrochemistry, 41, 1137-64 (2011).

The general process described above makes use of a flow cell-type arrangement, one embodiment of which is depicted in FIG. 1. It will be appreciated that the general design depicted in this figure is applicable to both cathode and anode active material recovery processes.

In FIG. 1, the apparatus 10 comprises two tanks 100, 200. One of the tanks will house the active material to be recovered, along with a solvent and the relevant chemicals used to effect this recovery, while the other tank may is intended to house the recovered lithium and may initially contain pure water (or similar solvent). Both tanks 100, 200 are connected to a redox flow cell 300, which comprises a cathode compartment 310 and an anode compartment 320, which are separated by an ion-selective membrane 330. The cathode compartment 310 includes a cathode electrode 315, while the anode compartment includes an anode electrode 325. The redox flow cell 300 also contains a power source 340 that is connected to the cathode 315 and anode 325 electrodes. In order to function, the apparatus 10 also includes: a first fluid pathway 350 running from the first tank 100 to the anode compartment 320 and back to the first tank, which fluid pathway also comprises a pump 355; and a second fluid pathway 360 running from the second tank 200 to the cathode compartment 310 and back to the second tank, which fluid pathway also comprises a pump 365. The arrangement described above relates to a configuration suitable for use with the recovery of cathode and/or anode active materials.

A redox mediator refers to a compound present (e.g., dissolved) in the solvent placed in the same tank (i.e. first tank) as the active material that acts as a molecular shuttle to transport the lithium to the electrode in the flow cell to which the tank is connected.

Any suitable redox mediator that is compatible with the active material and the solvent used in the tank (i.e. first tank) may be used. Suitable redox mediators that may be mentioned herein include, but are not limited to ferricyanide ($M_3Fe(CN)_6$), ferrocyanide ($M_4Fe(CN)_6$), ferrocene ($C_{10}H_{10}Fe$) and derivatives thereof, iodide (MI) and combinations thereof, where in each case M is independently selected from the group consisting of Li, Na, K and $NH_4$. As will be understood, when the active material contains lithium, M may preferably be Li and when the active material contains sodium, M may be Na. Any suitable concentration of the redox mediators may be used. For example, the total concentration of the redox mediator present in the solvent may be from 0.05 M to 1.5 M, such as from 0.1 M to 1 M, such as from 0.3 M to 0.5 M, such as 0.2 M. Derivatives of ferrocene that may be mentioned herein include ferrocene derivatives having the structure:

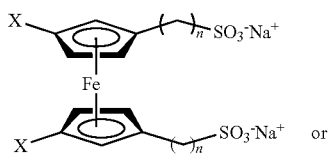

-continued

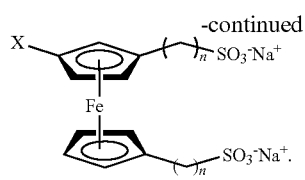

In the above formulae, X is selected from H, F, Cl, Br, I, $NO_2$, COOR, $C_{1-20}$ alkyl, $CF_3$, and COR, in which R is H or $C_{1-20}$ alkyl; n is from 0 to 20.

Specific derivatives of ferrocene that may be mentioned herein include but are not limited to bromoferrocene, ferrocenylmethyl dimethyl ethyl ammonium bis(trifluoromethanesulfonyl)imide (Fc1N112-TFSI), N-(pyridin-2-ylmethylene)-1-(2-(diphenylphosphino) ferrocenyl) ethanamine ($FeCp_2PPh_2RCN$), 1,1-dimethylferrocene (DMFc), tetraferrocene, di(ethylsulfonic sodium) ferrocene ($C_{14}H_{16}FeS_2O_6Na_2$), and di(trimethanesulfonic sodium) ferrocene ($C_{16}H_{22}FeS_2O_6Na_2$).

In particular embodiments of the invention that may be mentioned herein, the derivative of ferrocene may be di(t-rimethanesulfonic sodium) ferrocene ($C_{16}H_{22}FeS_2O_6Na_2$) or di(ethylsulfonic sodium) ferrocene ($C_{14}H_{16}FeS_2O_6Na_2$).

Further redox mediators that may be used in the current invention are described below with reference to WO 2013/012391.

Further suitable redox mediators that may be mentioned herein include, but are not limited to $(NH_4)_2S_x$ or, more particularly, viologens, $Li_2S_x$, $Na_2S_x$, and $K_2S_x$, wherein x is less than or equal to 8 and greater than or equal to 1.

Viologens are 1,1'-disubstituted 4,4'-bipyridinium ions (where the nitrogen atoms of the pyridine rings are substituted by an alkyl group (e.g. $C_1$ to $C_{12}$ alkyl)), with a suitable counterion (e.g. $Cl^-$, $F^-$, $Br^-$ and $I^-$). An example of a viologen of this type is paraquat. When used herein viologens may include related compounds, such as diquat and bipolaron.

Examples of redox mediators are discussed in depth in international application publication number WO 2013/012391, which is hereby incorporated by reference. For example, redox mediators disclosed in WO 2013/012391 include a metallocene derivative, a triarylamine derivative, a phenothiazine derivative, a phenoxazine derivative, a carbazole derivative, a transition metal complex, an aromatic derivative, a nitroxide radical, a disulfide, or a combination thereof.

The metallocene derivative used as a redox mediator may have the following structure:

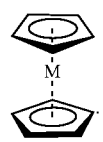

In the above formula, M can be Fe, Co, Ni, Cr, or V; each of the cyclopentadienyl rings, independently, can be substituted with one or more of the following groups: F, Cl, Br, I, $NO_2$, COOR, $C_{1-20}$ alkyl, $CF_3$, and COR, in which R can be H or $C_{1-20}$ alkyl.

The triarylamine derivative used as a redox mediator may have the following structure:

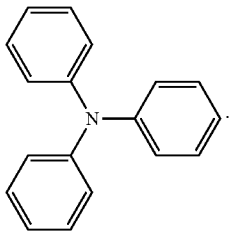 [SMILES: c1ccc(N(c2ccccc2)c2ccccc2)cc1]

In the above formula, each of the phenyl rings, independently, can be substituted with one or more of the following groups: F, Cl, Br, I, $NO_2$, COOR, $C_{1-20}$ alkyl, $CF_3$, and COR, in which R can be H or $C_{1-20}$ alkyl.

The phenothiazine derivative and the phenoxazine derivative used as a redox mediator may have the following structure:

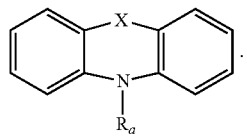

$R_a$ can be H or $C_{1-20}$ alkyl, X can be O or S, each of the aromatic moieties is optionally substituted with one or more of the following groups: F, Cl, Br, I, $NO_2$, COOR, R, $CF_3$, and COR, in which R can be H or $C_{1-20}$ alkyl.

The carbazole derivative used as a redox mediator may have one of the following structures:

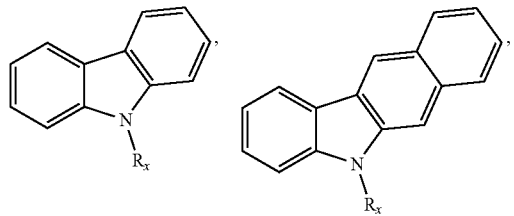

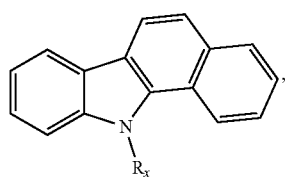

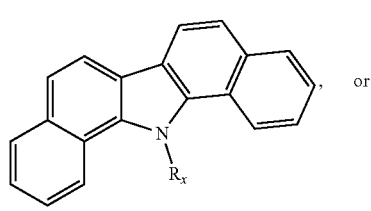

or

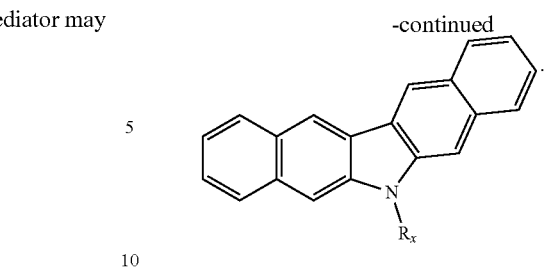

$R_x$ can be H or $C_{1-20}$ alkyl and each of the aromatic moieties is optionally substituted with one or more of the following groups: F, Cl, Br, I, $NO_2$, COOR, $C_{1-20}$ alkyl, $CF_3$, and COR, in which R can be H or $C_{1-20}$ alkyl.

The transition metal complex used as a redox mediator may have one of the following structures:

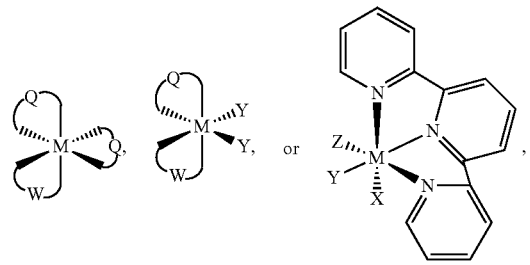

In the above formulae, M can be Co, Ni, Fe, Mn, Ru, or Os; each of the aromatic moieties is unsubstituted or is substituted with one or more of the following groups: F, Cl, Br, I, $NO_2$, COOR', R', $CF_3$, COR', OR', or NR'R", each R' and R" can independently be H or $C_{1-20}$ alkyl; each of X, Y, and Z can independently be F, Cl, Br, I, $NO_2$, CN, NCSe, NCS, or NCO; and each Q and W can independently be selected from:

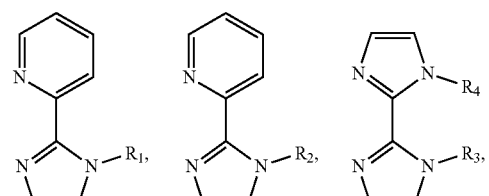

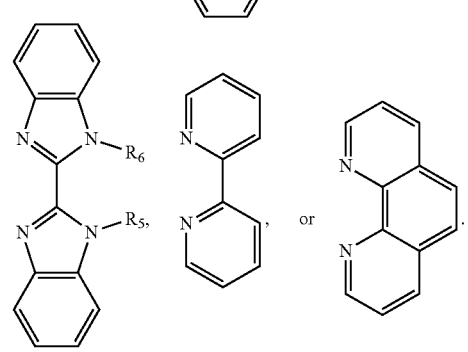

In these formulas, each of $R_1$, $R_2$, $R_3$, $R_4$, $R_5$, and $R_6$, can be F, Cl, Br, I, $NO_2$, COOR', R', $CF_3$, COR', OR', or NR'R". Again, each of the aromatic moieties is optionally substituted with one or more of the following groups: F, Cl, Br, I, NO$_2$, COOR', C$_{1-20}$ alkyl, CF$_3$, COR', OR', or NR'R", in which each of R' and R", independently, can be H or C$_{1-20}$ alkyl. For the avoidance of doubt, the point of attachment of each Q and W to the metal is through the two nitrogen atoms present in each of the Q and W molecules above, thus Q and W act as bidentate ligands in the transition metal complex.

The aromatic derivative used as a redox mediator may have the following structure:

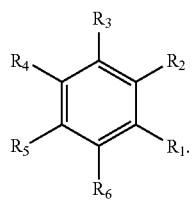

In these formulas, each of R$_1$, R$_2$, R$_3$, R$_4$, R$_5$, and R$_6$, can be C$_{1-20}$ alkyl, F, Cl, Br, I, NO$_2$, COOR', CF$_3$, COR', OR', OP(OR')(OR"), or NR'R", in which each of R' and R", independently, can be H, C$_{1-20}$ alkyl.

The nitroxide radical used as a redox mediator may the following structure:

In these formulas, each of R$_1$ and R$_2$, independently, can be C$_{1-20}$ alkyl or aryl. R$_1$, R$_2$, and N together can form a heteroaryl, heteroaralkyl, or heterocycloalkyl ring.

The disulfide used as a redox mediator may the following structure:

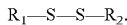

In these formulas, each of R$_1$ and R$_2$, independently, can be C$_{1-20}$ alkyl, COOR', CF$_3$, COR', OR', or NR'R", in which each of R' and R", independently, can be H or C$_{1-20}$ alkyl.

As will be appreciated, the method above also requires a solvent to be present in both the tank containing the active material and the tank that collects the metal ion to be recycled from said active material. A suitable solvent is water, which may be used alone or in combination with an organic solvent suitable for use in a battery. Suitable organic solvents that may be mentioned herein include, but are not limited to a glyme solvent, a cyclic carbonate (such as propylene carbonate, ethylene carbonate, diethyl carbonate butylene carbonate, fluoroethylene carbonate, chloroethylene carbonate, vinylene carbonate, and/or the like), a linear carbonate (such as dimethyl carbonate, diethyl carbonate, ethylmethyl carbonate, and the like), a cyclic ester (such as γ-butyrolactone, γ-valerolactone, and the like), a linear ester (such as methyl formate, methyl acetate, methyl butyrate, and the like), a cyclic or linear ether other than a glyme (such as tetrahydrofuran (and derivatives thereof), 1,3-dioxane, 1,4-dioxane, 1,2-dimethoxyethane, 1,4-dibutoxyethane, and the like), a nitrile (such as acetonitrile, benzonitrile, and/or the like), dioxolane or a derivative thereof, ethylene sulfide, sulfolane, and sultone or a derivative thereof. These solvents may be used in any suitable weight ratio with respect to the glyme solvent (e.g. tetraglyme). For example, the additional solvents may be selected from one or more of the group selected from propylene carbonate, ethylene carbonate, diethyl carbonate, dimethyl carbonate, ethyl methyl carbonate, tetrahydrofuran, sulfolane, and acetonitrile.

The glyme solvent may be selected from one or more of the group consisting of ethylene glycol dimethyl ether (monoglyme), diglyme, triglyme, tetraglyme, methyl nonafluorobutyl ether (MFE) and analogues thereof. Analogues of tetraglyme (CH$_3$(O(CH$_2$)$_2$)$_4$OCH$_3$) that may be mentioned include, but are not limited to, compounds where one or both of its CH$_3$ end members may be modified to either —C$_2$H$_5$ or to —CH$_2$CH$_2$Cl, or other similar substitutions. In certain embodiments of the invention that may be mentioned herein, the glyme solvent is tetraglyme.

In particular embodiments that may be mentioned herein the solvent used in first or second tanks may be water alone or water in combination with a glyme solvent (e.g. water and tetraglyme). For example, the solvent in both tanks may simply be pure water.

The first and second tanks, the cathode electrode and anode electrode, the ion selective membrane the power source and the flow paths used herein may be any conventionally used in the field. No particular limitation is placed on these components.

While the method outlined herein may be useful for the recovery of lithium or sodium from active materials, it is envisaged that the method may be particularly suited to the recovery of lithium from active materials, primarily because lithium is a rare metal, while sodium is abundant.

In a particular embodiment that may be mentioned herein, the active material may be a cathodic active material. Thus, in such an embodiment, there is disclosed a method that comprises the steps of:

(a) providing a cathodic active material comprising lithium ions;

(b) adding the cathodic active material to a redox mediator solution that comprises a solvent and a redox mediator to form a redox solution comprising lithium ions in a first tank;

(c) moving the redox solution from the first tank to a redox flow cell comprising a cathode compartment, having a cathode electrode, and an anode compartment, having an anode electrode, separated by an ion selective membrane, where the cathode and anode are attached to a power supply and the redox solution is subjected to an electrochemical reaction on the anode electrode, where the electrochemical reaction on the anode:

regenerates the redox mediator, which is then returned to the first tank; and enables transport of the lithium ions through the ion selective membrane into the cathode compartment, which comprises an aqueous catholyte solution as that is obtained from a second tank comprising said aqueous catholyte solution;

(d) capturing the lithium ions in the cathode compartment through an electrochemical reaction on the cathode electrode as LiOH and transferring the resulting aqueous LiOH catholyte solution to a second tank, wherein:

steps (c) and (d) can be repeated until the cathodic active material is consumed.

As noted above, the cathodic active material may come from a depleted (retired) battery or from the manufacturing processes to manufacture such batteries. Any form of the cathodic active material may be used. For example, the cathodic active material may still be attached to a cathode electrode of a dismantled sodium- or lithium-ion battery or is provided free from the cathode electrode.

Examples of cathodic active materials include, but are not limited to, NaFePO$_4$, NaCoO$_2$, Li$_x$FePO$_4$, Li$_x$NiCoMnO$_2$, $Li_xCoO_2$, $Li_xFePO_4$, $Li_xNi_{0.33}Co_{0.33}Al_{0.33}O_2$, $Li_xMn_2O_4$, $Li_xNi_{0.5}Mn_{1.5}O_4$, and $Li_xCoO_2$, where $0<x\le1$, and combinations thereof. In particular embodiments of the invention that may be referred to herein, the cathodic active material may be selected from one or more of $Li_xFePO_4$, $Li_xNiCoMnO_2$, $Li_xCoO_2$, $Li_xFePO_4$, $Li_xNi_{0.33}Co_{0.33}Al_{0.33}O_2$, $Li_xMn_2O_4$, $Li_xNi_{0.5}Mn_{1.5}O_4$, and $Li_xCoO_2$. In yet further embodiment of the invention, the cathodic active material may be $Li_xFePO_4$.

Any suitable redox mediator mentioned hereinbefore may be used in the method for recovering sodium or, more particularly, lithium ions from a cathodic active material. Particular examples that may be mentioned herein include, but are not limited to, ferricyanide ($M_3Fe(CN)_6$), ferrocyanide ($M_4Fe(CN)_6$), ferrocene ($C_{10}H_{10}Fe$) and derivatives thereof (e.g. di(ethylsulfonic lithium) ferrocene ($C_{14}H_{16}FeS_2O_6Li_2$)), iodide (MI) and bromide (MBr), where in each case M is independently selected from the group consisting of Li, Na, K and $NH_4$. More particularly, the redox mediator may be selected from one or more of the group consisting of ferricyanide ($M_3Fe(CN)_6$), ferrocyanide ($M_4Fe(CN)_6$), iodide (MI), and bromide (MBr), where in each case M is independently selected from the group consisting of Li, Na, K and $NH_4$. As will be appreciated when seeking to recover sodium from a cathodic active material, M in the redox mediator may preferably be sodium and when seeking to recover lithium from a cathodic active material, M in the redox mediator may preferably be lithium.

Any suitable concentration of the redox mediator may be used in the solvent present in the first tank. Examples of suitable concentrations include, but are not limited to a total concentration of the redox mediator present in the solvent is from 0.05 M to 1.5 M, such as 0.2 M. When used herein, the term "total concentration" is intended to mean that the sum of concentrations of redox mediators (when more than one redox mediator is present) fall within the cited range.

Any suitable solvent may be used in the first tank. For example any of the solvents (and combinations of solvents) referred to hereinbefore. In particular examples that may be mentioned herein, the solvent in the first tank may be water.

Initially, the aqueous catholyte solution may be water, water comprising oxygen, water comprising air, water comprising oxygen and $CO_2$, or water comprising air and $CO_2$. When used herein, when water is referred to it is intended to refer to pure water, that is deionized water. Subsequently, as the method is conducted, the aqueous catholyte solution starts to include LiOH and so, after steps (b) and (c) of the method above have been completed, the aqueous catholyte solution may be an aqueous LiOH solution, an aqueous LiOH solution comprising oxygen, an aqueous LiOH solution comprising air, an aqueous LiOH solution comprising oxygen and $CO_2$ with $Li_2CO_3$ precipitate, or an aqueous LiOH solution comprising air and $CO_2$ with $Li_2CO_3$ precipitate.

Particular embodiments of the process described above are provided in the examples section below. For completeness, the working principles of the process will now be described in detail by reference to the processing of a depleted lithium ion battery.

In pre-treatment steps, the spent lithium ion battery is fully discharged and then the battery is dismantled to obtain the cathodic and anodic active materials. The anodic and, particularly, the cathodic active materials may then be subjected to the processes described herein—either while still attached to the electrode material of the lithium ion battery or following removal from said electrode (e.g. by scraping said active material from the electrode by any suitable means). FIG. 1 depicts an example where the cathodic active material is $Li_xFePO_4$, ($0\le x\le 1$).

In FIG. 1, $Li_xFePO_4$ active material (e.g. scraped from a cathode electrode) is placed into a first tank 100, which contains an aqueous solution of ferricyanide ($Li_3Fe(CN)_6$, i.e. $[Fe(CN)_6]^{3-}$). Lithium ions are extracted from the $Li_xFePO_4$ in a leaching reaction shown in equation 1, which results in the formation of solid $FePO_4$ (which precipitates from solution) and $[Fe(CN)_6]^{4-}$ ions in solution (i.e. $Li_4Fe(CN)_6$). Simultaneously, the solution containing $[Fe(CN)_6]^{4-}$ and $Li^+$ is circulated into the anode compartment 320 of the redox flow cell 300, which anode compartment 320 contains the anode electrode 325. The first tank and anode compartment are connected together by means of a first fluid pathway 350, which may be formed by suitable pipes or other means and a pump 355. In the anode compartment, the $[Fe(CN)_6]^{4-}$ ions are regenerated to $[Fe(CN)_6]^{3-}$ (equation 2) and returned to the first tank 100 by means of the first fluid pathway to start a new round of lithium leaching from the cathodic active material. This regeneration of $[Fe(CN)_6]^{3-}$ in the anode compartment drives the migration of lithium ions through the ion-selective membrane 330 to the cathode compartment 310 of the flow cell 300. The cathode compartment 310 is connected to the second tank 200 by a second fluid pathway 360 that comprises a pump 365 in a similar manner to that described above for the fluid connection between the anode compartment 320 to the first tank 100 by the first fluid pathway 350. The cathode compartment incorporates the cathode electrode and in this compartment $OH^-$ is generated by either the oxygen reduction reaction (ORR, equation 3) or the hydrogen evolution reaction (HER, equation 4) to generate LiOH. In the case of the oxygen reduction reaction on the cathode, a voltage is applied and $O_2$ gas was blown into the cathode compartment of the cell. As will be appreciated, while the second tank and cathode compartment may initially contain pure water, as the leaching process continues the concentration of LiOH in the compartment and tank increases until the leaching process is stopped (e.g. when the cathodic active material has been depleted). The same process described above can be repeated for anodic active materials, which will be described in detail below.

The resulting concentrated LiOH in the second tank can be used to synthesize $Li_2CO_3$ by bubbling $CO_2$ into this solution (e.g. see equation 5) or directly used as raw material for lithium ion battery cathode materials synthesis.

Anode Tank (320):

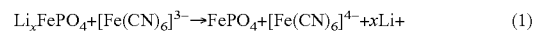

$$Li_xFePO_4+[Fe(CN)_6]^{3-}\rightarrow FePO_4+[Fe(CN)_6]^{4-}+xLi^+ \quad (1)$$

Anode Electrode (325):

$$[Fe(CN)_6]^{4-}\rightarrow [Fe(CN)_6]^{3-}+e^- \quad (2)$$

Cathode Electrode (315):

$$O_2+2H_2O+4Li^++4e^-\rightarrow 4LiOH \quad (3)$$

$$2H_2O+2e^-+2Li^+\rightarrow H_2\uparrow +2LiOH \quad (4)$$

Cathode tank (310):

$$2LiOH+CO_2\rightarrow Li_2CO_3+H_2O \quad (5)$$

Analogous reactions will occur for other cathodic active materials subjected to the currently described process. As will be appreciated, the exact reactions will depend on the nature of the active material and the redox mediators used.

In particular embodiments that may be mentioned herein, the active material may be an anodic active material. Thus, in such an embodiment, there is disclosed a method that comprises the steps of:

(a) providing an anodic active material comprising lithium ions;

(b) adding the anodic active material to a redox mediator solution that comprises a solvent and a redox mediator to form a redox solution comprising lithium ions in a first tank;

(c) moving the redox solution from the first tank to a redox flow cell comprising a cathode compartment, having a cathode electrode, and an anode compartment, having an anode electrode, separated by an ion selective membrane, where the cathode and anode are attached to a power supply and the redox solution is subjected to an electrochemical reaction on the anode electrode, where the electrochemical reaction on the cathode:

regenerates the redox mediator, which is then returned to the first tank; and enables transport of the lithium ions through the ion selective membrane into the cathode compartment, which comprises an aqueous catholyte solution as that is obtained from a second tank comprising said aqueous catholyte solution;

(d) capturing the lithium ions in the cathode compartment through an electrochemical reaction on the cathode electrode as LiOH and transferring the resulting aqueous LiOH catholyte solution to a second tank, wherein:

steps (c) and (d) can be repeated until the anodic active material is consumed.

Unless otherwise stated the same components mentioned hereinbefore are used in this process too.

While the process described herein make use of only a cathodic or anodic active materials separately, it will be appreciated that the same process as described above may be run for a combination of the cathodic and anodic active materials.

As noted above, the anodic active material may come from a depleted (retired) battery. Any form of the anodic active material may be used. For example, the anodic active material may still be attached to an anode electrode of a dismantled sodium- or lithium-ion battery or is provided free from the anode electrode.

Examples of anodic active materials include, but are not limited to, $Li_4Ti_5O_{12}$, graphite, silicon, hard carbon, and combinations thereof. It will be appreciated that the graphite, silicon, and hard carbon active materials may be impregnated with sodium or, more particularly, lithium following use in a battery.

Any suitable redox mediator mentioned hereinbefore may be used in the method for recovering sodium or, more particularly, lithium ions from an anodic active material. For example, the redox mediators mentioned hereinbefore (and their concentration levels) in particular relation to the recovery of cathodic active materials may also be used in the recovery of sodium or lithium from anodic active materials.

The process for recovering anodic active material is analogous to the process described hereinbefore for the recovery of cathodic active materials.

The current method is advantageous over the traditional hydrometallurgical extraction process for the following reasons.

(1) The current method uses a redox mediator as leaching reagent, while the traditional process uses a strong acid ($H_2SO_4$) as leaching reagent.

(2) In the current method, the leaching reagent can be regenerated on-site and reused/recycled, while those in the traditional process cannot be reused (which generates secondary waste and incurs additional cost).

(3) The current method uses an integrated setup to separate $Li^+$ from other elements while the traditional process requires additional chemicals (e.g. strong base or carbonate) to precipitate $Li^+$ and other elements for separation.

(4) The leaching and separation processes in the current method can proceed simultaneously and continuously while those in the traditional process are two-step processes with different reagents.

In comparison with the conventional recycling process, the fact that the leaching reagents of the current method can be regenerated in the cell and reused means that the current method reduces secondary pollution and cost.

Furthermore, the current method combines leaching and separation into one step which proceed simultaneously and continuously. This makes the apparatus operating the current method much more compact and efficient. This also increases the profitability of battery recycling business. Furthermore, it will be appreciated that a number of parallel devices may be run, allowing high-throughput and recovery the desired metals for re-use.

Further aspects and embodiments of the invention are provided in the following non-limiting examples.

EXAMPLES

An embodiment of the invention relates to a method of recovering lithium from the active material of a lithium ion battery (LIB). The method comprises a novel redox targeting-based lithium ion battery recycling process which has been shown to address the issues of the traditional hydrometallurgical extraction process.

The method comprises of two parts: a mechanical process and a redox targeting-based leaching and separation process. The mechanical process is the same as the traditional hydrometallurgical extraction process. It comprises of the steps of (1) releasing residual electricity of spent batteries by discharge pretreatment; (2) removing plastic packaging and casings from the batteries and separating out the cathode and anode electrodes; and optionally (3) scraping cathodic and anodic active materials from the electrodes The redox targeting-based leaching and separation process comprise the steps of: (4) adding the cathodic or anodic active materials from Step 3 to a redox mediator solution, oxidising the active materials and hence releasing a solution of lithium ions in a first tank. Simultaneously, (5) the reacted solution is moved to a redox flow cell to regenerate the redox mediator and drive the migration of lithium ions through a membrane to a cathode compartment, where $OH^-$ is generated by an oxygen reduction reaction (ORR) or hydrogen evolution reaction (HER). The combined reactions produce a LiOH solution in a second tank of the cathode compartment. Optionally, by bubbling $CO_2$ in the produced LiOH solution, $Li_2CO_3$ can be precipitated and obtained in the second tank, while a transition metal oxide or phosphate can be obtained in the first tank as the final products. As a result, leaching (step 4) and metal separation (step 5) proceed simultaneously and continuously in the current method.

Although lithium is recovered in the examples below, sodium can also be recovered by a similar method using suitable starting materials and redox mediators.

Working Principle

The working principle of the redox targeting-based leaching and separation process is illustrated with reference to FIG. 1 and the equations listed below.

Using the cathodic active material $Li_xFePO_4$, $0 \leq x \leq 1$ as an example, the scraped cathodic active material is immersed into a 0.2 mol/L $[Fe(CN)_6]^{3-}$ solution in a first tank 10 of the anode compartment, the immersion of which extracts $Li^+$ into the solution from $Li_xFePO_4$ and forms $FePO_4$ as a solid (step 4: leaching process; see eq. 1).

Simultaneously, the aqueous products of eq. 1 ($[Fe(CN)_6]^{4-}$ and $Li^+$) is circulated into a redox flow cell and subjected to an electrochemical reaction, where the reaction regenerates $[Fe(CN)_6]^{3-}$ (eq. 2), which is returned to the first tank for use in the leaching process, and enables transport and migration of $Li^+$ through a Nafion 117 membrane to the cathode compartment of the cell comprising an pure aqueous medium (water) that is obtained from a second tank 20. The $Li^+$ are captured in the second tank as LiOH solution, because $OH^-$ is generated by an oxygen reduction reaction (ORR, eq. 3) or a hydrogen evolution reaction (HER, eq. 4). In the case of ORR, a voltage is applied and $O_2$ gas is blown into the cathode compartment of the cell.

The produced concentrated LiOH could be used to synthesise $Li_2CO_3$ by bubbling $CO_2$ into this solution (eq. 5), or it could be directly used as a raw material for lithium ion battery cathode synthesis.

The leaching efficiency of $Li_xFePO_4$ could be evaluated by monitoring the charging time of the cell. Based on the reaction mechanism below, the leaching efficiency ($\eta_L$) is calculated by the equation:

$$\eta_L = \frac{it}{cm}$$

in which t is the charging time, i is current, c is the specific capacity of $Li_xFePO_4$ (160 mAh/g), and m is the weight of $Li_xFePO_4$ that is used.

First Tank:

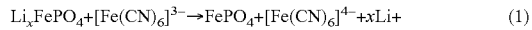

$Li_xFePO_4 + [Fe(CN)_6]^{3-} \rightarrow FePO_4 + [Fe(CN)_6]^{4-} + xLi+$ (1)

Anode:

$[Fe(CN)_6]^{4-} \rightarrow [Fe(CN)_6]^{3-} + e^-$ (2)

Cathode:

$O_2 + 2H_2O + 4Li^+ + 4e^- \rightarrow 4LiOH$ (3)

$2H_2O + 2e^- + 2Li \rightarrow H_2\uparrow + 2LiOH$ (4)

Second Tank:

$2LiOH + CO_2 \rightarrow Li_2CO_3 + H_2O$ (5)

Materials and Pre-Preparation

The materials were purchased from the sources as provided below.

Lithium ferrocyanide $Li_3Fe(CN)_6$ was made from LiOH and Prussian blue (PB).

LiOH (reagent grade) and PB (reagent grade) were purchased from Sigma Aldrich.

$LiFePO_4$ was purchased from Sigma Aldrich.

Nafion 117 membrane was purchased from Dupont.

Carbon felt was used as the electrodes.

Deionised (DI) water was obtained from a deionizer.

The redox flow cell was fabricated by sandwiching Nafion 117 between two pieces of carbon felts, the carbon felts were clamped by two pieces of stainless steel. Rubber frames were used as gasket.

Voltage on the cell was monitored by an Arbin battery testing system.

Example 1: Recycling of Lithium from Cathodic Active Materials

To validate the current method for battery material cycling, 3.8 g $LiFePO_4$ was scraped from an aluminium foil substrate of a cathodic electrode sheet and immersed into a 0.2 M $Li_3Fe(CN)_6$ solution (60 mL) in a first tank. Deionised water ($H_2O$, 30 mL; no salt added) was used as an catholyte in a second tank. In this arrangement, HER (eq. 4) prevails, and by bubbling $O_2$, ORR (eq. 3) prevails). Both catholyte and anolyte were pumped flowing through the redox flow cell and tanks. The current circulated between an external circuit and the cell was kept at 20 mA with electrode area of 4 cm² (entire surface area of electrode).

Results

As shown in FIG. 2a, a gradual increase in voltage to 1.8 V at a charge capacity of 550 mAh was observed at the end of the charging process. A leaching efficiency of around 90% based on the charge capacity was calculated based on the equation listed under the section "Working Principle". After charging, the catholyte was collected and dried in an oven at 70° C. to evaporate water. White powder of LiOH (FIG. 2b) was obtained after drying the catholyte overnight. The obtained LiOH was characterized by FTIR (spectrum depicted in FIG. 3). The quantity was nearly consistent with the charge capacity of the cell.

With suitable redox mediators, similar processes can be implemented to recycle batteries with $LiCoO_2$, $LiNi_{1/3}Mn_{1/3}Co_{1/3}O_2$ and other cathode materials.

Example 2: Recycling of Lithium from Anodic Active Materials $Li_4Ti_5O_{12}$ was scraped from anode of a spent battery and immersed into a 0.2 M $Li_3Fe(CN)_6$ solution (60 mL) in a first tank. Deionised water ($H_2O$, 30 mL; no salt added) was used as a catholyte in a second tank. Both catholyte and anolyte were pumped flowing through the redox flow cell and tanks. The current circulated between an external circuit and the cell was kept at 20 mA with electrode area of 4 cm².

Example 3: Recycling of Sodium $NaFePO_4/NaCoO_2$ was scraped from cathode of spent sodium ion battery and immersed into a 0.2 M $Na_3Fe(CN)_6$ solution (60 mL) in a first tank. Deionised water ($H_2O$, 30 mL; no salt added) was used as an catholyte in a second tank. Both catholyte and anolyte were pumped flowing through the redox flow cell and tanks. The current circulated between an external circuit and the cell was kept at 20 mA with electrode area of 4 cm².

Further Developments

Further developments include studying how the electrolyte in LIBs can be recycled or processed. The electrolyte may contain lithium salts such as $LiPF_6$, which releases HF if in contact with $H_2O$. Therefore, the electrolyte should be removed prior to the leaching process of the current method.

Having established the potential and results of the current redox targeting-based lithium battery recycling technology, the inventors will continue to optimise the reactions, especially those on the anodic electrode.

The invention claimed is:
1. A method of recovering lithium or sodium from an active material of a lithium or sodium ion battery, respectively, the method comprising:
 (a) providing an active material comprising lithium or sodium ions;
 (b) adding the active material to a redox mediator solution that comprises a solvent and a redox mediator to form a redox solution comprising lithium or sodium ions in a first tank;

(c) moving the redox solution from the first tank to a redox flow cell comprising a cathode compartment, having a cathode electrode, and an anode compartment, having an anode electrode, separated by an ion selective membrane, where the cathode electrode and anode electrode are attached to a power supply and the redox solution is subjected to an electrochemical reaction on the anode electrode, where the electrochemical reaction on the anode:

regenerates the redox mediator, which is then returned to the first tank; and enables transport of the lithium ions through the ion selective membrane into the cathode compartment, which comprises an aqueous catholyte solution as that is obtained from a second tank comprising said aqueous catholyte solution;

(d) capturing the lithium ions in the cathode compartment through an electrochemical reaction on the cathode electrode as LiOH and transferring the resulting aqueous LiOH catholyte solution to a second tank, wherein:

steps (c) and (d) can be repeated until the active material is consumed.

2. The method according to claim 1, wherein active material is a cathodic and/or anodic active material.

3. The method according to claim 2, wherein the cathodic active material is still attached to a cathode electrode of a dismantled sodium- or lithium-ion battery or is provided free from the cathode electrode.

4. The method according to claim 2, wherein the cathodic active material is selected from one or more of $NaFePO_4$, $NaCoO_2$, more particularly, $Li_xFePO_4$, $Li_xNiCoMnO_2$, $Li_xCoO_2$, $Li_xFePO_4$, $Li_xNiO_{0.33}Co_{0.33}Al_{0.33}O_2$, $Li_xMn_2O_4$, $Li_xNi_{0.5}Mn_{1.5}O_4$, and $Li_xCoO_2$, where $0<x\leq 1$.

5. The method according to claim 4, wherein the cathodic active material is $Li_xFePO_4$.

6. The method according to claim 1, wherein the redox mediator is selected from one or more of the group consisting of ferricyanide ($M_3Fe(CN)_6$), ferrocyanide ($M_4Fe(CN)_6$), ferrocene ($C_{10}H_{10}Fe$) and derivatives thereof, iodide (MI) and bromide (MBr), where in each case M is independently selected from the group consisting of Li, Na, K and $NH_4$.

7. The method according to claim 6, wherein the redox mediator is selected from one or more of the group consisting of ferricyanide ($M_3Fe(CN)_6$), ferrocyanide ($M_4Fe(CN)_6$), iodide (MI), and bromide (MBr), where in each case M is independently selected from the group consisting of Li, Na, K and $NH_4$.

8. The method according to claim 6, wherein the derivative of ferrocene is di(ethylsulfonic lithium) ferrocene ($C_{14}H_{16}FeS_2O_6Li_2$).

9. The method according to claim 6, wherein the total concentration of the redox mediator present in the solvent is from 0.05 M to 1.5 M.

10. The method according to claim 2, wherein the solvent is pure water.

11. The method according to claim 1, wherein the aqueous catholyte solution is initially selected from one of water, water comprising oxygen, water comprising air, water comprising oxygen and $CO_2$, or water comprising air and $CO_2$.

12. The method according to claim 1, wherein after steps (b) and (c) have been completed, the aqueous catholyte solution is an aqueous LiOH solution, an aqueous LiOH solution comprising oxygen, an aqueous LiOH solution comprising air, an aqueous LiOH solution comprising oxygen and $CO_2$ with $Li_2CO_3$ precipitate, or an aqueous LiOH solution comprising air and $CO_2$ with $Li_2CO_3$ precipitate.

13. The method according to claim 2, wherein the anodic active material is still attached to an anode electrode of a dismantled lithium-ion battery or is provided free from the anode electrode.

14. The method according to claim 2, wherein the anode active material is selected from one or more of $Li_4Ti_5O_{12}$, Graphite, Silicon, Hard carbon.

* * * * *